(12) United States Patent
Yang

(10) Patent No.: US 10,536,965 B2
(45) Date of Patent: Jan. 14, 2020

(54) METHOD FOR TRANSMITTING/RECEIVING SIGNAL AND DEVICE THEREFOR

(71) Applicant: LG ELECTRONICS INC., Seoul (KR)

(72) Inventor: Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/780,622

(22) PCT Filed: Dec. 16, 2016

(86) PCT No.: PCT/KR2016/014834
§ 371 (c)(1),
(2) Date: May 31, 2018

(87) PCT Pub. No.: WO2017/105145
PCT Pub. Date: Jun. 22, 2017

(65) Prior Publication Data
US 2018/0376500 A1      Dec. 27, 2018

Related U.S. Application Data

(60) Provisional application No. 62/268,510, filed on Dec. 17, 2015.

(51) Int. Cl.
*H04W 72/14* (2009.01)
*H04L 5/00* (2006.01)
(Continued)

(52) U.S. Cl.
CPC ........... *H04W 72/14* (2013.01); *H04L 1/0003* (2013.01); *H04L 1/1812* (2013.01);
(Continued)

(58) Field of Classification Search
CPC ... H04L 1/1861; H04L 5/0055; H04L 5/0053; H04L 5/0048; H04L 1/0028;
(Continued)

(56) References Cited

U.S. PATENT DOCUMENTS

2009/0305698 A1* 12/2009 Zhang ................... H04L 1/0028
455/434
2010/0323709 A1* 12/2010 Nam ..................... H04L 5/0094
455/450

(Continued)

FOREIGN PATENT DOCUMENTS

WO      2011037392      3/2011

OTHER PUBLICATIONS

PCT International Application No. PCT/KR2016/014834, Written Opinion of the International Searching Authority dated Mar. 17, 2017, 19 pages.

(Continued)

*Primary Examiner* — Jung Liu
(74) *Attorney, Agent, or Firm* — Lee Hong Degerman Kang Waimey

(57) ABSTRACT

The present invention relates to a wireless communication system. More particularly, the present invention relates to a method and a device therefor, the method comprising: a step of receiving scheduling information through a PDCCH in a subframe of #n, and a step of receiving a PDCCH according to the scheduling information in a subframe of #(n+X), wherein n is an integer greater than or equal to 0 and X is an integer greater than or equal to 0 and is determined on the basis of an index of a control channel resource used for the transmission of the PDCCH.

18 Claims, 11 Drawing Sheets

(51) Int. Cl.
  *H04W 72/12* (2009.01)
  *H04L 1/00* (2006.01)
  *H04L 1/18* (2006.01)
  *H04W 72/04* (2009.01)
  *H04L 5/14* (2006.01)

(52) U.S. Cl.
  CPC .......... *H04L 5/0048* (2013.01); *H04L 5/0053* (2013.01); *H04L 5/0055* (2013.01); *H04L 5/0094* (2013.01); *H04W 72/0406* (2013.01); *H04W 72/0446* (2013.01); *H04W 72/12* (2013.01); *H04L 5/0007* (2013.01); *H04L 5/14* (2013.01)

(58) Field of Classification Search
  CPC ... H04L 1/1867; H04L 1/1896; H04L 5/0007; H04L 1/0075; H04L 5/0035; H04L 5/0057; H04L 12/2869; H04L 12/5695; H04L 47/00; H04L 47/70; H04L 47/78; H04L 47/821; H04L 47/827; H04W 72/04
  See application file for complete search history.

(56) References Cited

U.S. PATENT DOCUMENTS

2011/0274060 A1    11/2011  Luo et al.
  2011/0286406 A1*   11/2011  Chen ..................... H04L 1/1861
                                                              370/329
  2013/0039202 A1*   2/2013   Feuersanger ........... H04L 5/001
                                                              370/252
  2014/0003356 A1    1/2014   Wang et al.
  2015/0237644 A1*   8/2015   Golitschek Edler von
                                  Elbwart ............... H04B 7/2656
                                                              370/329
  2015/0282125 A1*   10/2015  Lee ....................... H04L 1/1812
                                                              370/329

OTHER PUBLICATIONS

Panasonic, "MPDCCH 24 ECCEs RE mapping", 3GPP TSG RAN WG1 Meeting #83, R1-156940, Nov. 2015, 3 pages.
Samsung, "M-PDCCH ECCE Structure and Aggregation Levels", 3GPP TSG RAN WG1 Meeting #82bis, R1-155424, Oct. 2015, 4 pages.
European Patent Office Application Serial No. 16876087.4, Search Report dated Jun. 28, 2019, 15 pages.
3 Generation Partnership Project; Technical Specification Group Access Network; Evolved Universal Terrestrial Radio Access (E-UTRA); Physical layer procedures (Release 12), 3GPP TS 36.213, Dec. 2015, 160 pages.

* cited by examiner

PDSCH-ACK/NACK timing (UL-DL configuration #1)

PHICH/UL grant-PUSCH timing (UL-DL configuration #1)

HARQ processes in UL-DL configuration #1

METHOD FOR TRANSMITTING/RECEIVING SIGNAL AND DEVICE THEREFOR

CROSS-REFERENCE TO RELATED APPLICATIONS

This application is the National Stage filing under 35 U.S.C. 371 of International Application No. PCT/KR2016/014834, filed on Dec. 16, 2016, which claims the benefit of U.S. Provisional Application No. 62/268,510, filed on Dec. 17, 2015, the contents of which are all hereby incorporated by reference herein in their entirety.

TECHNICAL FIELD

The present invention relates to a wireless communication system, and more specifically, to methods and devices for transmitting/receiving signals.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE OF THE INVENTION

Technical Task

An object of the present invention devised to solve the problem lies in a method and apparatus for efficiently transmitting signals in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

To achieve these and other advantages and in accordance with the purpose of the present invention, as embodied and broadly described, according to one embodiment, a method of receiving a data by a communication device in a wireless communication system, includes the steps of receiving scheduling information via a PDCCH (physical downlink control channel) in a subframe #n, and receiving a PDSCH (physical downlink shared channel) according to the scheduling information in a subframe #(n+X). In this case, the n corresponds to an integer equal to or greater than 0 and the X corresponds to an integer equal to or greater than 0 and can be determined according to an index of a control channel resource used for transmitting the PDCCH.

To further achieve these and other advantages and in accordance with the purpose of the present invention, according to a different embodiment, a communication device used in a wireless communication system includes an RF (radio frequency) unit, and a processor, the processor configured to receive scheduling information via a PDCCH (physical downlink control channel) in a subframe #n, the processor configured to receive a PDSCH (physical downlink shared channel) according to the scheduling information in a subframe #(n+X).

The n corresponds to an integer equal to or greater than 0 and the X corresponds to an integer equal to or greater than 0 and can be determined according to an index of a control channel resource used for transmitting the PDCCH.

Preferably, the control channel resource can include a CCE (control channel element).

Preferably, if the PDCCH is transmitted using a plurality of CCEs, the X can be determined according to an index of a first CCE among a plurality of the CCEs.

Preferably, the control channel resource can include a PDCCH candidate.

Preferably, the scheduling information includes a first set of information among the entire information necessary for scheduling the PDSCH, and a second set of information among the entire information can be allocated via higher layer signaling.

Preferably, the first set of information includes RB (resource block) allocation information, a HARQ (hybrid automatic repeat request) process ID, an NDI (new data indicator), an RV (redundancy version), and TPC (transmit power control), and the second set of information can include an MCS (modulation and coding scheme) and a TBS (transmit block size).

To further achieve these and other advantages and in accordance with the purpose of the present invention, according to a further different embodiment, a method of transmitting control information by a communication device in a wireless communication system, includes the steps of receiving a data channel in a subframe #n, and transmitting HARQ-ACK (hybrid automatic repeat request) information corresponding to the data channel in a subframe #(n+X). In this case, the n corresponds to an integer equal to or greater than 0 and the X corresponds to an integer equal to or greater than 0 and can be determined according to (i) an index of a data channel resource used for transmitting the data channel and/or (ii) an index of a control channel resource used for transmitting a control channel indicating the data channel.

To further achieve these and other advantages and in accordance with the purpose of the present invention, according to a further different embodiment, a communication device used in a wireless communication system includes an RF (radio frequency) unit, and a processor, the processor configured to receive a data channel in a subframe #n, the processor configured to transmit HARQ-ACK (hybrid automatic repeat request) information corresponding to the data channel in a subframe #(n+X). The n corresponds to an integer equal to or greater than 0 and the X corresponds to an integer equal to or greater than 0 and can be determined according to (i) an index of a data channel resource used for transmitting the data channel and/or (ii) an index of a control channel resource used for transmitting a control channel indicating the data channel.

Preferably, the data channel resource can include a PRB (physical resource block).

Preferably, if the data channel is transmitted using a plurality of PRBs, the X can be determined according to an index of a first PRB among a plurality of the PRBs.

Preferably, the control channel resource can include a CCE (control channel element).

Advantageous Effects

According to the present invention, signals can be efficiently transmitted/received in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Mode for Invention

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$n$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
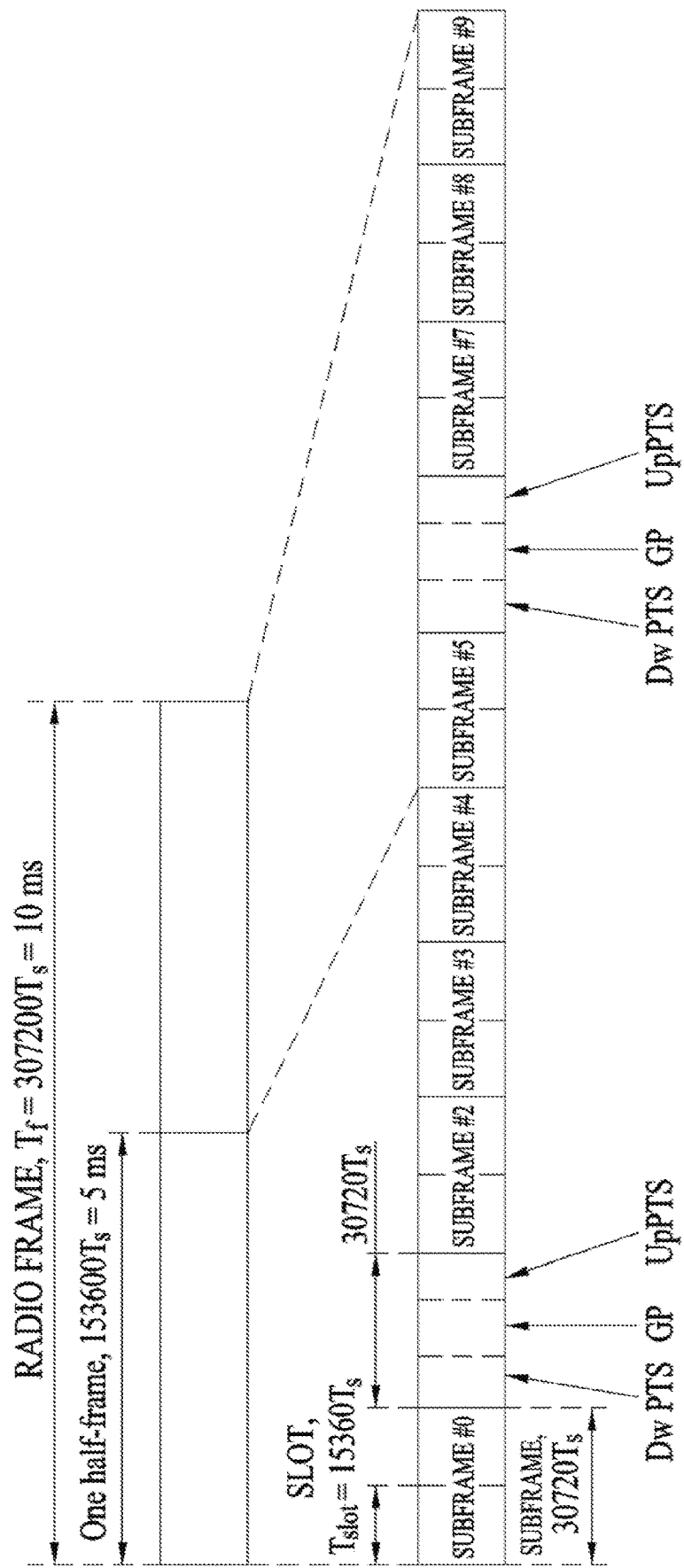
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Particularly, FIG. 1 shows a radio frame structure for TDD, used in 3GPP LTE(-A). Table 1 shows UL-DL configurations (UD-cfgs) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
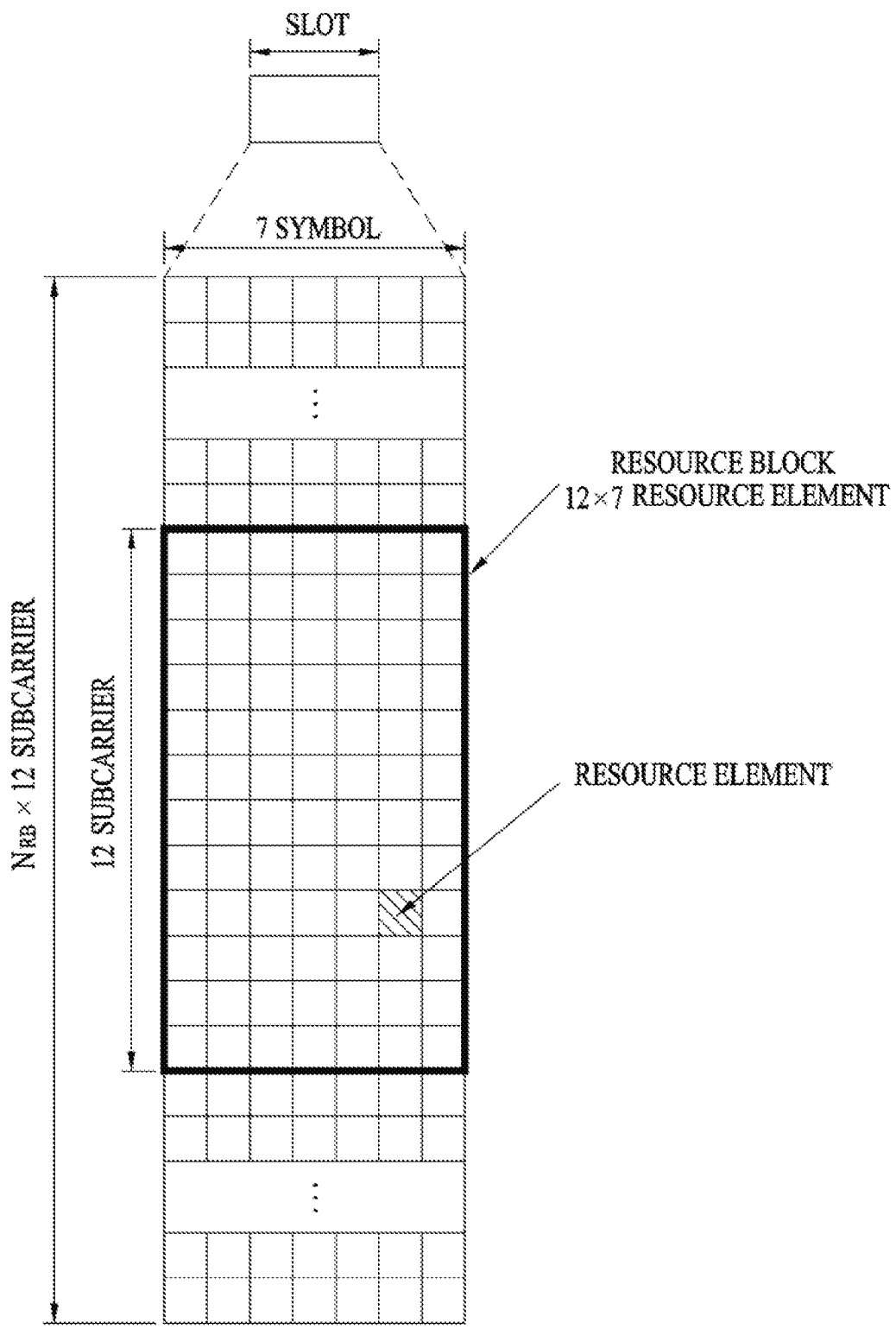
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
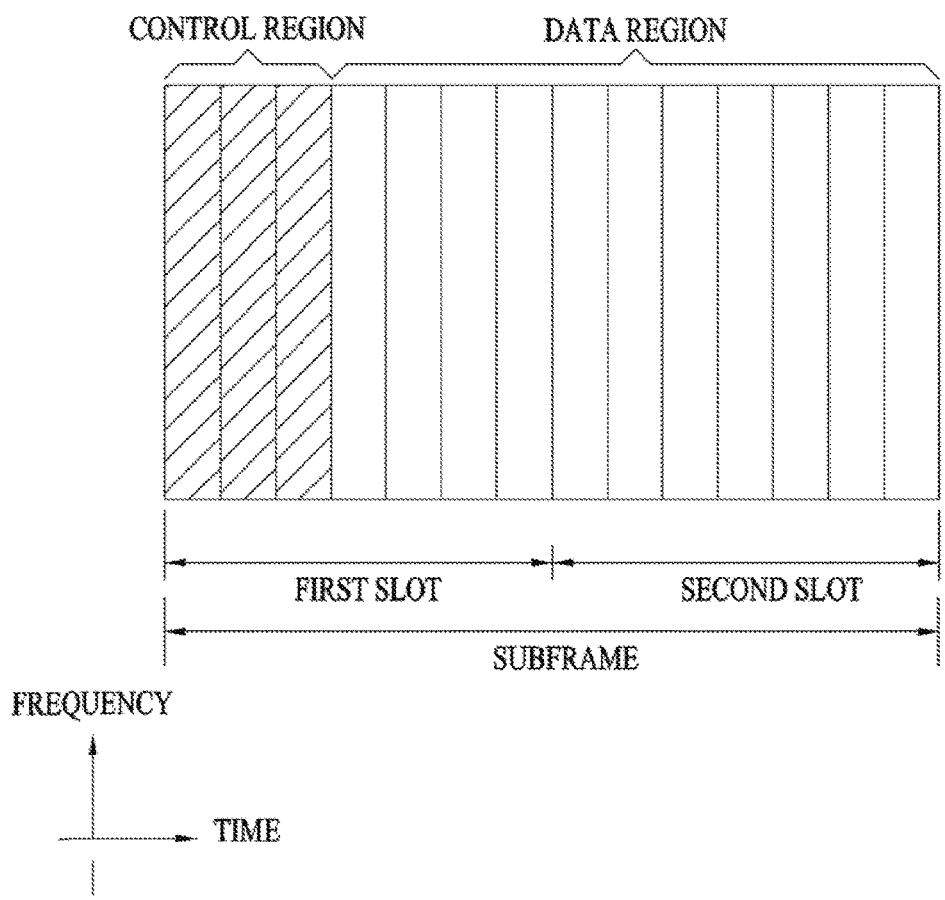
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Transmission using UE-specific reference signals
DCI Format
Format 0: Resource grants for the PUSCH(Physical Uplink Shared Channel) transmissions (uplink)
Format 1: Resource assignments for single codeword PDSCH (Physical Downlink Shared Channel) transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH (Physical Uplink Control Channel) and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc.

Table 3 illustrates example of control information transmitted by a DCI format 0.

TABLE 3

| | Information Field |
|---|---|
| (1) | Flag for format 0/format 1A differentiation |
| (2) | Hopping flag |
| (3) | Resource block assignment and hopping resource allocation |
| (4) | Modulation and coding scheme and redundancy version |
| (5) | New data indicator (NDI) |
| (6) | TPC command for scheduled PUSCH |
| (7) | Cyclic shift for DMRS |
| (8) | UL index (TDD) |
| (9) | CQI request |

The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Table 4 illustrates PDCCH formats.

TABLE 4

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 5 shows sizes of the CSS and USS.

TABLE 5

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. Transmission modes for configuring multi-antenna technique information contents of DCI formats are listed in the following.

As mentioned earlier in FIG. 3, an FDD DL carrier and a TDD DL subframes use first n OFDM symbols of a subframe to transmit PDCCH, PHICH, PCFICH or the like, which is a physical channel used for transmitting various control informations and use the rest of OFDM symbols to transmit PDSCH. The number of symbols used for transmitting a control channel in each subframe is delivered to a user equipment dynamically via such a physical channel as PCFICH and the like or semi-statically via an RRC signaling. The n value can be set by 1 to 3 (2 to 4) symbols according to subframe property and system property (FDD/TDD, system bandwidth, etc.). Meanwhile, PDCCH, which is a physical channel used for transmitting DL/UL scheduling and various kinds of control information, is transmitted via a limited OFDM symbol in a legacy LTE system. Hence, LTE-A system introduces an enhanced PDCCH (E-PDCCH), which is multiplexed with PDSCH more freely in a manner of using a FDM scheme. Similar to PDCCH, E-PDCCH carries DCI. For instance, E-PDCCH is able to carry DL scheduling information and UL scheduling information. In particular, a user equipment receives E-PDCCH and may be then able to receive data or control information via PDSCH corresponding to the received E-PDCCH. And, the user equipment receives E-PDCCH and may be then able to transmit data or control information via PUSCH corresponding to the received E-PDCCH. As mentioned in the foregoing description, according to legacy LTE, a PDCCH candidate region (hereinafter PDCCH search space) is reserved in advance in a control region and PDCCH of a specific UE is transmitted to a partial region of the PDCCH search space. Hence, the UE can obtain PDCCH of the UE in the PDCCH search space via blind detection. Similarly, the UE monitors E-PDCCH candidate in a search space for E-PDCCH to receive the E-PDCCH. The E-PDCCH is transmitted on a set of one or more contiguous eCCEs (enhanced CCEs). The eCCE corresponds to a logical allocation unit for providing a coding rate based on a radio channel state. The eCCE corresponds to a plurality of eREGs (enhanced REGs).

Figure 4:
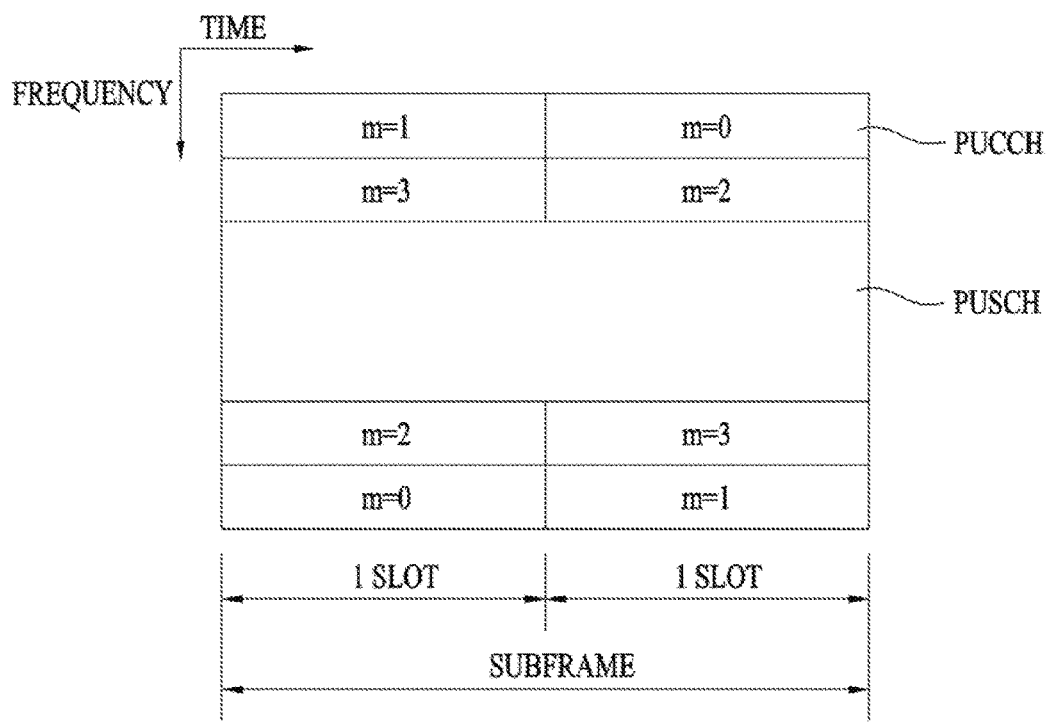
FIG. 4 illustrates an uplink subframe structure.

FIG. 4 illustrates an uplink subframe structure for use in LTE(-A).

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

- Scheduling Request (SR): This is information used to request a UL-SCH resource and is transmitted using On-Off Keying (OOK) scheme.
- HARQ-ACK: This is a response to a downlink data packet (e.g. codeword) on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords. A HARQ-ACK response includes positive ACK (simply, ACK), negative ACK (NACK), DTX (Discontinuous Transmission) or NACK/DTX. Here, the term HARQ-ACK is used interchangeably with the term HARQ ACK/NACK and ACK/NACK.
- Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 6 shows the mapping relationship between PUCCH formats and UCI in LTE(-A).

TABLE 6

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |

TABLE 6-continued

| PUCCH format | UCI (Uplink Control Information) |
| --- | --- |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
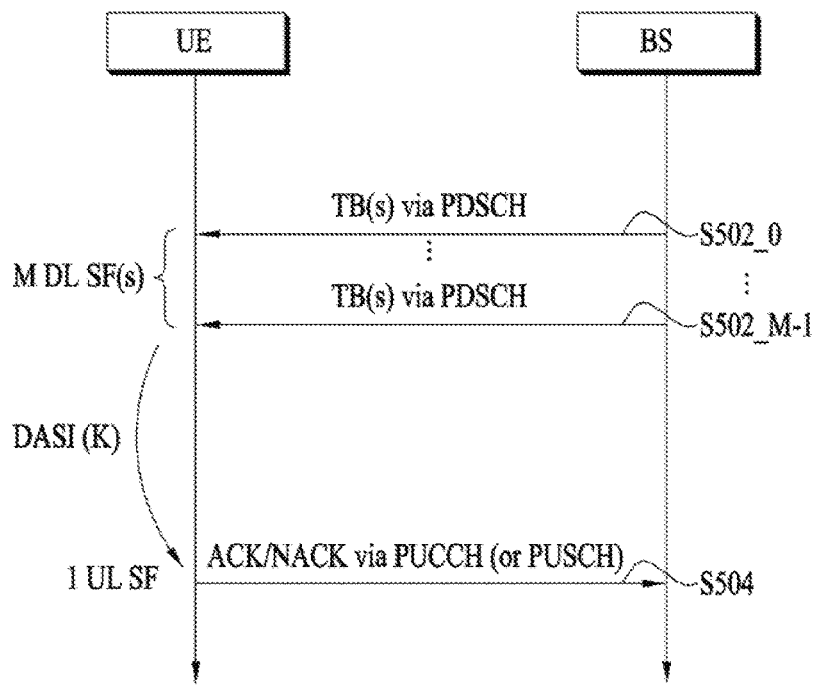
FIGS. 5 and 6 illustrate TDD UL ACK/NACK (Uplink Acknowledgement/Negative Acknowledgement) transmission timing in a single cell situation.
Figure 6:
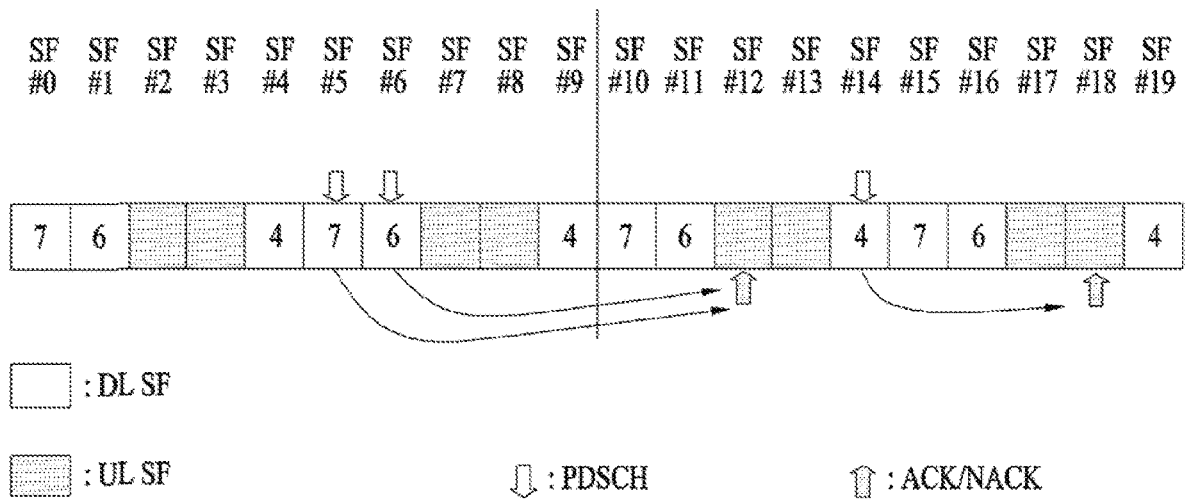

FIGS. 5 to 6 illustrate PDSCH-UL ACK/NACK timing. In this case, UL ACK/NACK corresponds to ACK/NACK transmitted in UL in response to DL data (e.g., PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M−1. While ACK/NACK is transmitted through a PUCCH basically, ACK/NACK is transmitted through a PUSCH when the PUSCH is transmitted at an ACK/NACK transmission time. Various PUCCH formats shown in Table 6 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 7 shows DASI (K: $\{k_0, k_1, \ldots, k_{M-1}\}$) defined in LTE(-A). Table 7 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 7

| TDD UL-DL Configuration | \multicolumn{10}{c|}{Subframe n} |
| --- | --- | --- | --- | --- | --- | --- | --- | --- | --- | --- |
|  | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for at least one DL transmission signal (e.g. PDSCH) received through M DL SFs through a single UL SF. ACK/NACK for a plurality of DL SFs is transmitted through a single UL SF as follows.

1) ACK/NACK bundling: ACK/NACK bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for ACK/NACK transmission. ACK/NACK responses to the plurality of data units are identified by combinations of PUCCH resources used for ACK/NACK transmission and transmitted ACK/NACK (e.g. bit values and QPSK symbol values). Channel selection is also referred to as ACK/NACK selection and PUCCH selection.

FIG. 6 illustrates UL ACK/NACK transmission timing when UL-DL configuration #1 is set. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
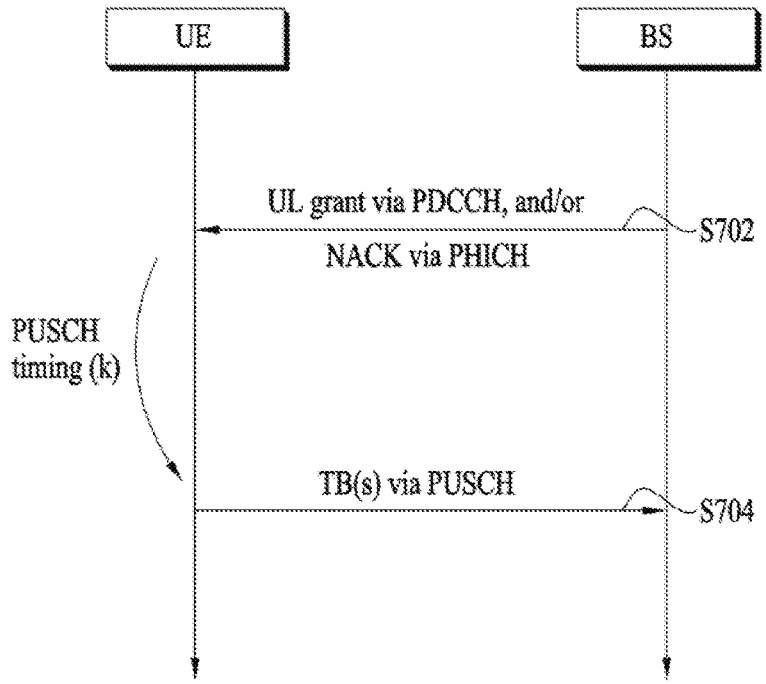
FIGS. 7 and 8 illustrate TDD PUSCH (Physical Uplink Shared Channel) transmission timing in a single cell situation.
Figure 8:
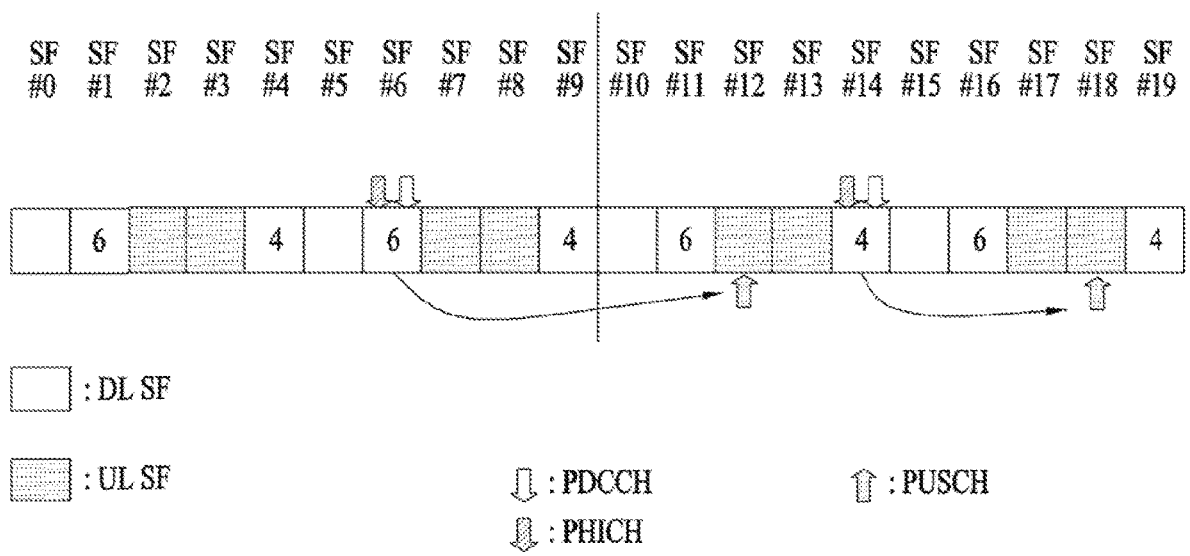

FIGS. 7 and 8 illustrate PHICH/UL grant (UG)-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 8 shows a UAI (Unlink Association Index) (k) for PUSCH transmission in LTE(-A). Table 8 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 8

| TDD UL-DL Configuration | \multicolumn{10}{c|}{subframe number n} |
| --- | --- | --- | --- | --- | --- | --- | --- | --- | --- | --- |
|  | 0 | 1 | 2 | 3 | 4 | 5 | 6 | 7 | 8 | 9 |
| 0 | 4 | 6 |  |  | 4 | 6 |  |  |  |  |
| 1 |  | 6 |  |  | 4 | 6 |  |  |  | 4 |
| 2 |  |  |  | 4 |  |  |  |  | 4 |  |
| 3 | 4 |  |  |  |  |  |  |  | 4 | 4 |
| 4 |  |  |  |  |  |  |  |  | 4 | 4 |
| 5 |  |  |  |  |  |  |  |  | 4 |  |
| 6 | 7 | 7 |  |  |  | 7 | 7 |  |  | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
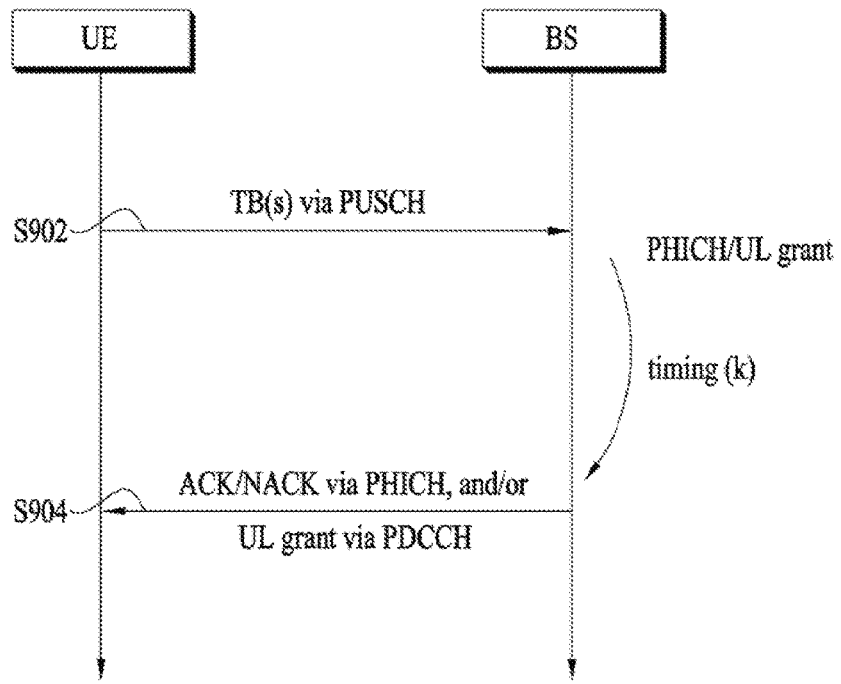
FIGS. 9 and 10 illustrate TDD DL ACK/ANCK transmission timing in a single cell situation.
Figure 10:
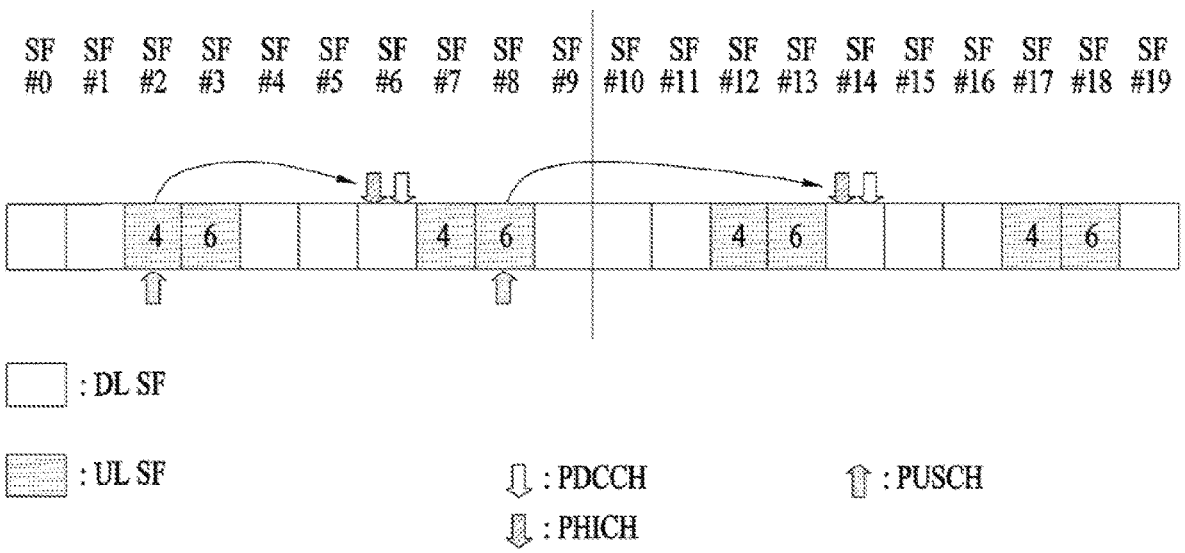

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframes (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 9 shows a UAI for PHICH/UL grant transmission in LTE(-A). Table 9 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 9

| TDD UL-DL Configuration | \multicolumn{10}{c}{subframe number i} |

| TDD UL-DL Configuration | 0 | 1 | 2 | 3 | 4 | 5 | 6 | 7 | 8 | 9 |
|---|---|---|---|---|---|---|---|---|---|---|
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   | 6 | 6 |   |
| 4 |   |   |   |   |   |   |   | 6 | 6 |   |
| 5 |   |   |   |   |   |   |   |   | 6 |   |
| 6 | 6 | 4 |   |   |   | 7 | 4 |   |   | 6 |

FIG. 10 illustrates PHICH/UL grant transmission timing when UL-DL configuration #1 is set. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

A description will be given of PHICH resource assignment. When a PUSCH is transmitted in subframe #n, the UE determines a corresponding PHICH resource in subframe #(n+kPHICH). In FDD, kPHICH has a fixed value (e.g. 4). In TDD, $k_{PHICH}$ has a value depending on UL-DL configuration. Table 10 shows $k_{PHICH}$ values for TDD and is equivalent to Table 9.

TABLE 10

| TDD UL-DL Configuration | 0 | 1 | 2 | 3 | 4 | 5 | 6 | 7 | 8 | 9 |
|---|---|---|---|---|---|---|---|---|---|---|
| 0 |   |   | 4 | 7 | 6 |   |   | 4 | 7 | 6 |
| 1 |   |   | 4 | 6 |   |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version (RV).

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are set differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 11 shows the maximum number of DL HARQ processes according to UL-DL configuration in TDD.

TABLE 11

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 12 shows the number of synchronous UL HARQ processes and HARQ RTT in TDD. The number of UL SFs is defined per UL-DL cfg and the number of UL HARQ processes and (UL) HARQ RTT are set differently according to UL-DL configuration. HARQ RTT may refer to an interval (in unit of SF or ms) from when a UL grant is received to when a PHICH (corresponding to the UL grant) is received through transmission of a PUSCH (corresponding to the UL grant) or an interval from PUSCH transmission timing to retransmission timing corresponding thereto. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (WIT: 13 SFs)=>SF #48: PUSCH (RTT: 11 SFs) =>SF #52: PUSCH (RTT: 14 SFs).

TABLE 12

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 8) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 8). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 8) and subframe n+7.

Figure 11:
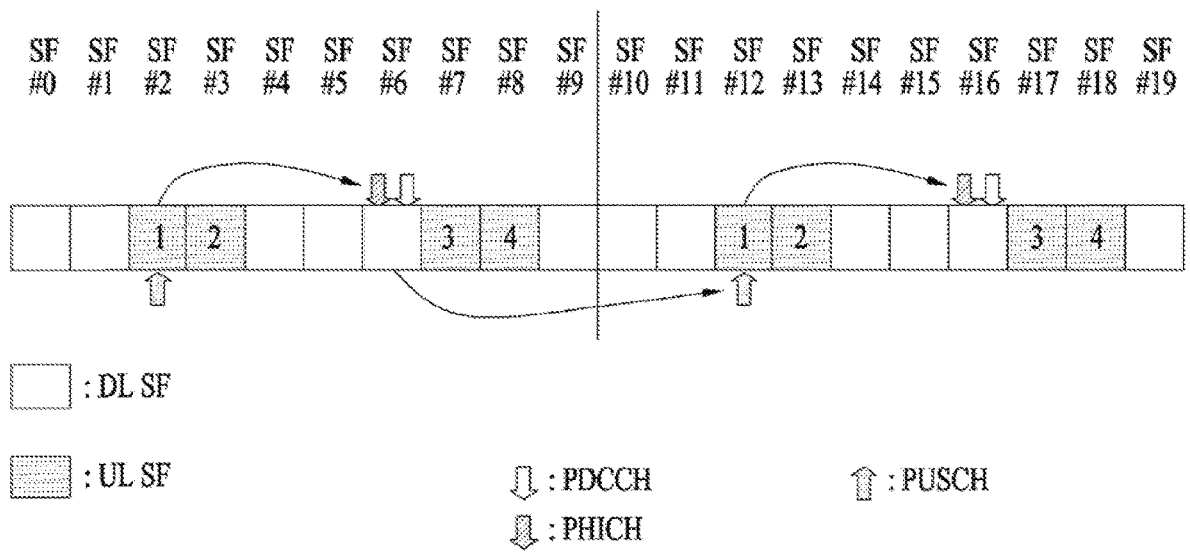
FIG. 11 illustrates a TDD HARQ (Hybrid Automatic Repeat request) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
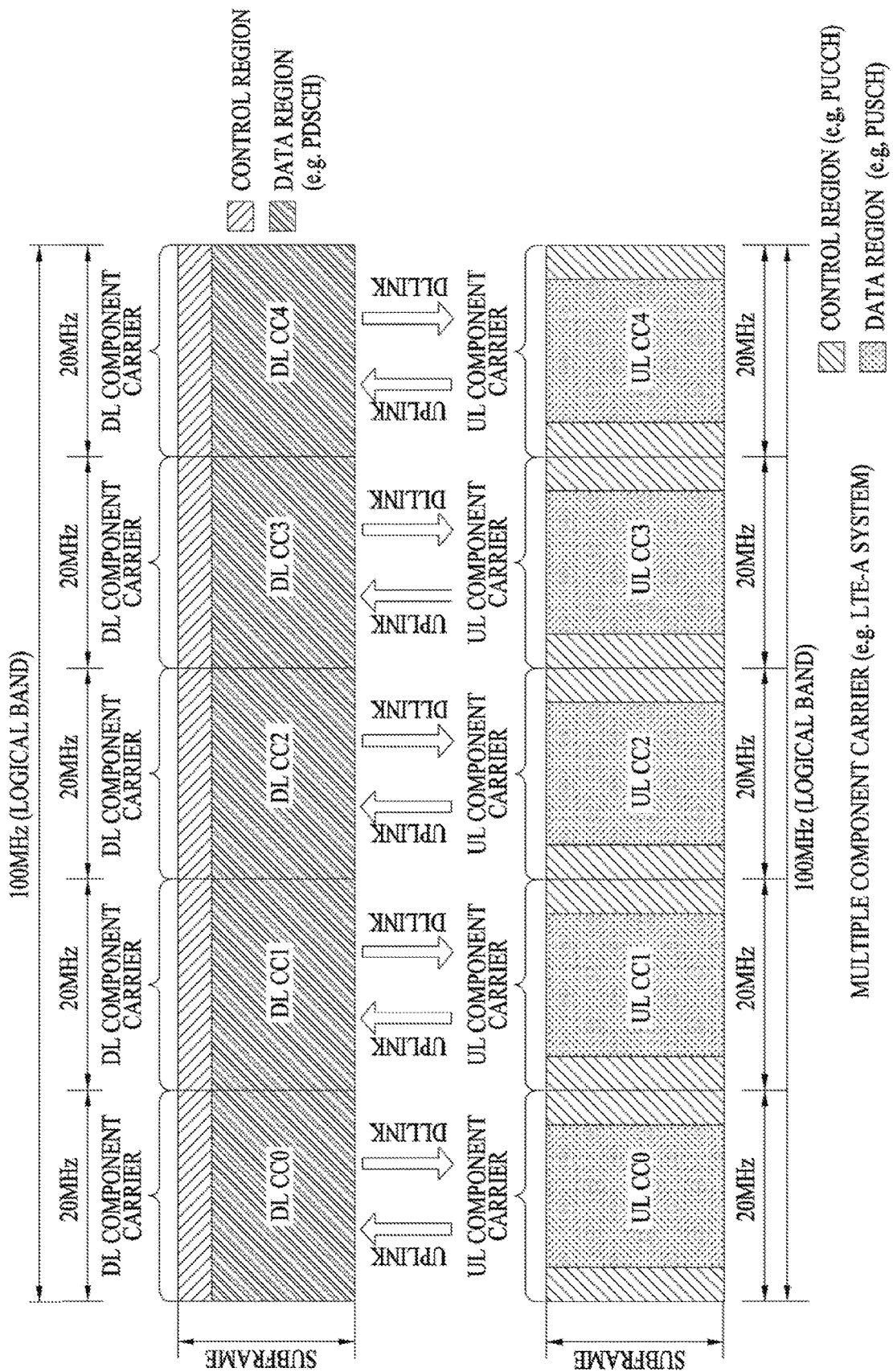
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 13:
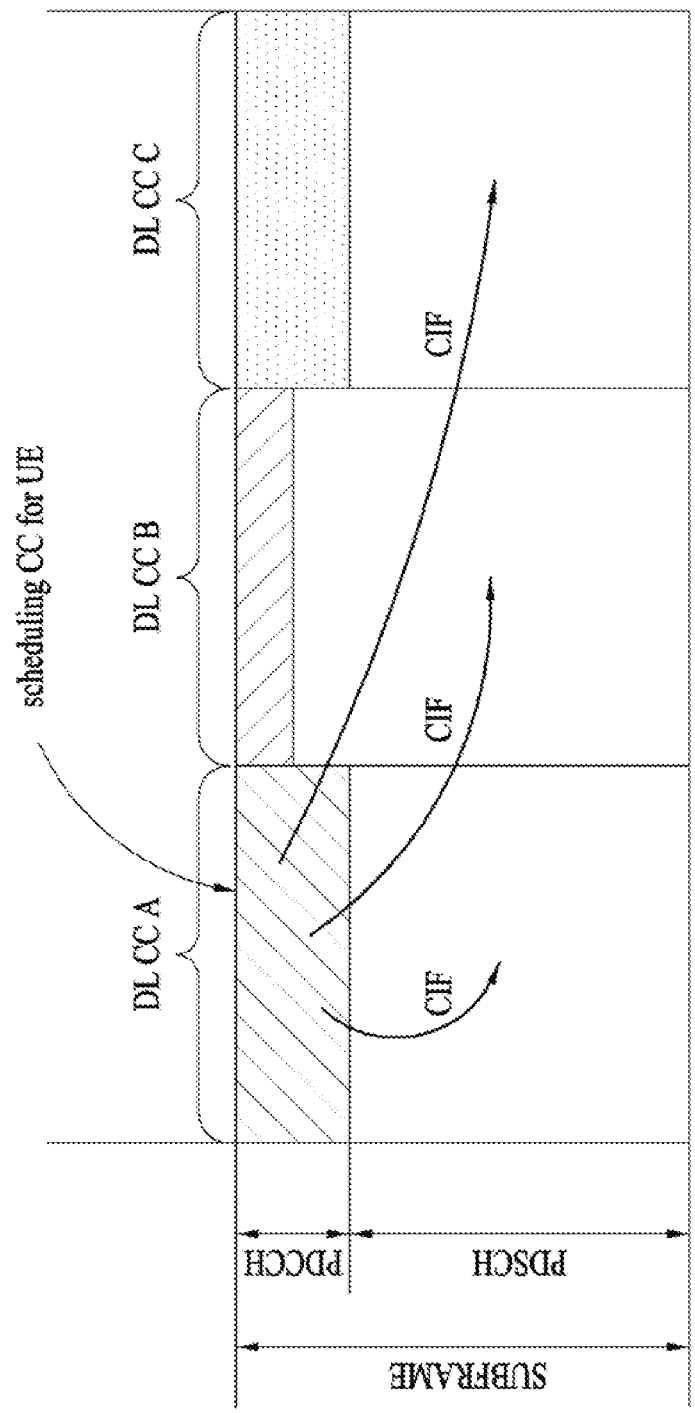
FIG. 13 illustrates scheduling when multiple carriers are aggregated.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC. The scheduling CC/scheduled CC may also be called MCC/SCC in the following description.

When cross-CC scheduling is set, CCs carrying signals are defined according to signal type as follows.
PDCCH (UL/DL grant): scheduling CC (or MCC)
PDSCH/PUSCH: CC indicated by a CIF of a PDCCH, detected from a scheduling CC
DL ACK/NACK (e.g. PHICH): scheduling CC (or MCC) (e.g. DL PCC)
UL ACK/NACK (e.g. PUCCH): UL PCC Embodiment A system appearing after Rel-10/11/12_based LTE-A system is considering supporting CA (e.g., up to 32 cells) for a plurality of cells/carriers (hereinafter, cells) for a single UE to transmit high-capacity fast data. Meanwhile, if data scheduling is performed on each cell by applying a legacy scheduling scheme to a UE (large CA UE) of which CA is set to a plurality of cells, overhead of a control signaling resource (e.g., (E)PDCCH transmission resource carrying scheduling DCI) can be considerably increased in response to the data scheduling. And, if the number of large CA UEs increases and cross-CC scheduling configuration increases, it is probable that control congestion (e.g., (E)PDCCH blocking) is to be aggravated.

A representative legacy method for reducing control signaling (resource) overhead includes 1) a multi-cell scheduling method for scheduling a plurality of cells at the same time by transmitting DCI on a plurality of cells via a single control channel (e.g., (E)PDCCH) and 2) a hybrid scheduling method that a part of scheduling information is semi-statically configured via higher layer signaling such as RRC (radio resource control) signaling and the rest of the scheduling information is dynamically indicated via a control channel such as (E)PDCCH. In case of using the multi-cell scheduling method, it may be able to reduce CRC (cyclic redundancy check) overhead. Yet, if the number of scheduling target cells is less, it may have a demerit in that DCI overhead increases. Meanwhile, in case of using the hybrid scheduling method, it may be able to reduce DCI overhead. Yet, it may have a demerit in that flexibility of scheduling information configured via RRC is degraded.

In the following, an implicit scheduling method is proposed to supplement the demerits of the legacy method. According to the implicit scheduling method, step 1) a part of scheduling information is implicitly linked with a control channel transmission resource (via specific signaling) and step 2) final scheduling is performed by combining DCI content (corresponding to the remaining scheduling information) received via a detected control channel with (partial) scheduling information linked with the resource in which the control channel is transmitted/detected.

Specifically, in the step 1), the control channel transmission resource may correspond to one selected from the group consisting of a subframe, an OFDMA/SC-FDMA symbol, a PRB (physical resource block), (e)CCE, and (E)PDCCH candidate index in which a control channel is transmitted. And, the specific signaling may correspond to higher layer signaling such as L1 (layer 1)/L2/RRC or signaling of (E)PDCCH form. L1 includes a PHY (physical) layer and L2 includes MAC (medium access control) layer, RLC (radio link control) layer, and a PDCP (packet data convergence protocol) layer. And, the specific signaling may correspond to UE-specific signaling or UE-common signaling. And, (E)PDCCH_based signaling may dynamically indicate a scheduling information candidate among a plurality of scheduling information candidates via (E)PDCCH in a state that a plurality of the scheduling information candidates capable of being linked with the control channel transmission resource are (semi-statically) configured via higher layer signaling. Meanwhile, scheduling information, which is linked according to a control channel transmission resource, can be independently (e.g., differently) configured for scheduling flexibility. And, when a control channel is transmitted using a plurality of control channel transmission resources, it may use scheduling information linked with an index of a specific control channel transmission resource (e.g., a first control channel transmission resource) among a plurality of the control channel transmission resources.

If the scheduling information linked with the control channel transmission resource is defined as implicit-info in the step 1) and the remaining scheduling information received via a control channel in the step 2) is defined as explicit-info, it may consider combinations described in the following (Alternatives 1 to 5). Partial information can be omitted in each of the combinations depending on a usage/purpose. First of all, abbreviation/content used in the following combinations is explained.

RA: Resource Allocation (e.g., RB allocation). RA can indicate RB set allocation information. An RB set can be freely indicated in a unit of RB(G) using a bitmap or can be indicated by indicating a start RB(G) index and the number of RB(G)s for continuously allocated RB(G)s (refer to Alternatives 1 to 5).

RB: Resource Block. There are a PRB (physical RB) and a VRB (virtual RB).

DMRS CS: Demodulation Reference Signal Cyclic Shift. A DMRS sequence (e.g., Zadoff-Chu sequence) is identified by a base sequence and a CS. The DMRS sequence is used for PUCCH that transmits HARQ-ACK in response to a DL data.

MCS: Modulation and Coding Scheme

TBS: Transport Block Size. TBS indicates a data size. MCS and TBS can be independently indicated. A combination between MCS and TBS can be indicated using MCS/TBS index.

NDI: New Data Indicator. NDI indicates whether a data corresponds to new data or retransmission data.

RV: Redundancy Version

TPC: Transmit Power Control

CRC: Cyclic Redundancy Check. CRC is used to check an error of control information and is masked by RNTI indicating usage/receiver of the control information.

HARQ: Hybrid Automatic Repeat reQuest

1) Alt 1
  A. Implicit-info={full RA (e.g., starting RB index+number of RBs), DMRS CS}
  B. Explicit-info={MCS/TBS index, HARQ process ID, NDI, RV, TPC, CRC}

2) Alt 2
  A. Implicit-info={full RA (e.g., starting RB index+number of RBs), DMRS CS, MCS/TBS index}
  B. Explicit-info={HARQ process ID, NDI, RV, TPC, CRC}

3) Alt 3
  A. Implicit-info={partial RA (e.g., starting RB index or number of RBs), DMRS CS}
  B. Explicit-info={remaining RA (e.g., number of RBs or starting RB index), MCS/TBS index, HARQ process ID, NDI, RV, TPC, CRC}

4) Alt 4
  A. Implicit-info={partial RA (e.g., starting RB index or number of RBs), DMRS CS, MCS/TBS index}
  B. Explicit-info={remaining RA (e.g., number of RBs or starting RB index), HARQ process ID, NDI, RV, TPC, CRC}

5) Alt 5
  A. Implicit-info={MCS/TBS index, DMRS CS}
  B. Explicit-info={full RA (e.g., starting RB index+number of RBs), HARQ process ID, NDI, RV, TPC, CRC}

A linkage configuration between a control channel transmission resource (i.e., control resource) and implicit-info and an operation according to the linkage configuration are explained with reference to Alt 1 and Alt 5 in the following. First of all, if (E)PDCCH is transmitted/detected via the Alt 1 described in the following (e.g., a control resource 2), a UE combines implicit-info={starting RB index=X2, number of RBs=Y2, DMRS CS=Z2} linked with the control resource 2 with explicit-info={MCS/TBS index, HARQ process ID, NDI, RV, TPC, CRC} (DCI contents) received via the (E)PDCCH to receive PDSCH corresponding to the entire scheduling information or transmit PUSCH. Subsequently, if (E)PDCCH is transmitted/detected via the Alt 5 described in the following (e.g., a control resource 2), a UE combines implicit-info={MCS/TBS index=A2, DMRS CS=B2} linked with the control resource 2 with explicit-info={starting RB index, number of RBs, HARQ process ID, NDI, RV, TPC, CRC}(DCI contents) received via the (E)PDCCH to receive PDSCH corresponding to the entire scheduling information or transmit PUSCH.

1) Example (Alt 1)

A. Control resource 1: starting RB index=X1, number of RBs=Y1, DMRS CS=Z1

B. Control resource 2: starting RB index=X2, number of RBs=Y2, DMRS CS=Z2

C. Control resource n: starting RB index=Xn, number of RBs=Yn, DMRS CS=Zn

2) Example (Alt 5)

A. Control resource 1: MCS/TBS index=A1, DMRS CS=B1

B. Control resource 2: MCS/TBS index=A2, DMRS CS=B2

C. Control resource n: MCS/TBS index=An, DMRS CS=Bn

Additionally, in order to make various implicit-info to be selected (for scheduling flexibility), it may be able to configure implicit-info, which is linked with each control channel transmission resource, to be changed in a unit of a subframe (group) and/or an OFDMA/SC-FDMA symbol (group). And, since the proposed method has the characteristic which is based on implicit linkage for scheduling information, it is unable to exclude the possibility that a scheduling constraint occurs according to a status. In order to mitigate the possibility, it may be able to configure a specific subframe to which the proposed implicit scheduling method is applied and a normal subframe to which a legacy scheduling method is applied to be TDMed (time division multiplexing). In this case, if scheduling for retransmission is configured to be performed through a normal subframe only (in particular, if scheduling for initial transmission having an RV initial value is configured to be performed via a specific subframe only), it may be able to additionally omit NDI and RV from explicit-info.

And, it may consider a method of differently configure transmission timing of a data channel (e.g., PDSCH/PUSCH) according to a control channel resource index in consideration of a specific situation (a situation of applying an ICIC (inter-cell interference coordination) technique to control an impact of inter-cell interference). For example, it may be able to differently configure timing (e.g., subframe) of transmitting a data channel corresponding to a DL/UL grant DCI according to an index of a resource (e.g., (e)CCE or (E)PDCCH candidate) in which a control channel (e.g., (E)PDCCH) carrying the DL/UL grant DCI is transmitted. If the control channel (e.g., (E)PDCCH) carrying the DL/UL grant DCI is transmitted using a plurality of resources (e.g., (E)CCE), it may be able to differently configure timing (e.g., subframe) of transmitting a data channel corresponding to the DL/UL grant DCI according to an index of a specific resource (e.g., first e(CCE)). This can be appropriate for a situation that ICIC is required for DL control signaling (e.g., (E)PDCCH) in time domain.

In the following, a linkage configuration between an index of a control channel resource (i.e., control resource) and data channel transmission timing (e.g., data TX timing) and an operation example for the linkage configuration are explained. For example, if (E)PDCCH is transmitted/detected via a control resource 2 of an SF #N under the configuration described in the following, a UE can perform a transmission/reception operation in response to PDSCH/PUSCH corresponding to the (E)PDCCH via data TX timing=SF #(N+X2) linked with the control resource 2. In this case, X1≠X2≠ ... ≠Xk can be configured. In case of PDSCH, Xn (n=1, 2, ~k) is restricted to an integer equal to or greater than 0. In case of PUSCH, Xn (n=1, 2, ~k) is restricted to an integer equal to or greater than 4 A unit of the Xn (n=1, 2, ~k) can be configured by an SF, a slot, or an OFDMA/SC-FDMA symbol (group).

1) Example

A. Control resource 1 in SF #N: data TX timing=SF #(N+X1)

B. Control resource 2 in SF #N: data TX timing=SF #(N+X2)

C. Control resource k in SF #N: data TX timing=SF #(N+Xk)

Figure 14:
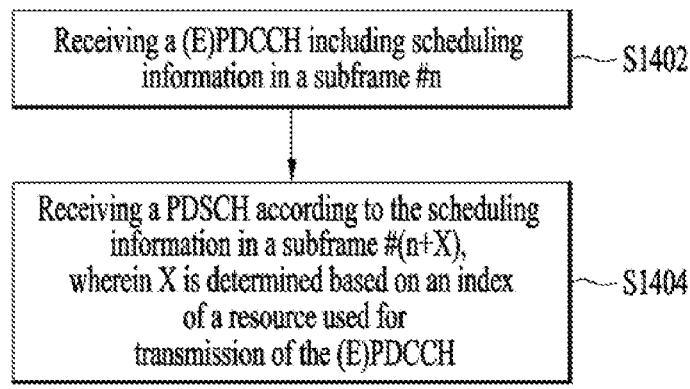
FIGS. 14 to 15 are flowcharts illustrating a signal transmission procedure according to the present invention.

FIG. 14 is a flowchart illustrating a signal transmission procedure according to the present invention. FIG. 14 illustrates DL scheduling. UL scheduling can be similarly performed as well.

Referring to FIG. 14, a UE can receive scheduling information through (E)PDCCH in a subframe #n [S1402]. Subsequently, the UE can receive (E)PDCCH in a subframe #(n+X) according to the scheduling information [S1404]. In this case, n corresponds to an integer equal to or greater than 0 and X corresponds to an integer equal to or greater than 0 and can be determined according to an index of a control channel resource used for transmitting PDCCH. In this case, the control channel resource can include (E)CCE. If PDCCH is transmitted using a plurality of CCEs, the X can be determined according to an index of a first CCE among a plurality of the CCEs. And, the control channel resource can include (E)PDCCH candidate.

As a different method, it may consider a method of differently configuring transmission timing of HARQ-ACK signal according to a resource index of a control channel and/or a resource index of a data channel in consideration of a specific situation (e.g., a situation to which ICIC is applied) similar to the abovementioned situation. For example, it may be able to differently configure timing (e.g., SF) of transmitting a HARQ-ACK signal (e.g., PUCCH/PHICH) in response to a reception of a data channel according to an index of a resource (e.g., (e)CCE or (E)PDCCH candidate) in which a control channel (e.g., (E)PDCCH) carrying a DL/UL grant DCI and/or an index of a resource (e.g., PRB) in which a data channel (e.g., PDSCH/PUSCH) corresponding to the DL/UL grant DCI is transmitted. When a control channel is transmitted using a plurality of control channel resources (e.g., (e)CCE), it may be able to differently configure timing (e.g., SF) of transmitting HARQ-ACK signal (e.g., PUCCH/PHICH) in response to reception of a data channel according to an index of a specific resource (e.g., first (e)CCE) among a plurality of the control channel resources. And, when a data channel is transmitted using a plurality of data channel resources (e.g., PRB), it may be able to differently configure timing (e.g., SF) of transmitting HARQ-ACK signal (e.g., PUCCH/PHICH) in response to reception of a data channel according to an index of a specific resource (e.g., first PRB) among a plurality of the data channel resources. The present method can be suitable for a situation that requires ICIC for UL control signaling (e.g., PUCCH) in frequency domain.

In the following, a linkage configuration between an index of a control channel resource (i.e., control resource) and HARQ-ACK transmission timing and an operation example according to the linkage configuration are explained. If (E)PDCCH is transmitted/detected via a control resource 2 of an SF #N under a configuration described in the following, a UE can perform a HARQ-ACK transmission/reception operation on PDSCH/PUSCH corresponding to the (E)PDCCH via HARQ-ACK timing=SF #(N'+Y2) linked with the control resource 2. In this case, SF

N' corresponds to transmission timing of a data channel. Y1 Y2 Yk can be configured. Yn (n=1, 2, ~k) can be restricted to an integer equal to or greater than 4. A unit of the Yn (n=1, 2, ~k) can be given by an SF, a slot, or an OFDMA/SC-FDMA symbol (group).

1) Example

A. Control resource 1 in SF #N: HARQ-ACK timing=SF #(N'+Y1)

B. Control resource 2 in SF #N: HARQ-ACK timing=SF #(N'+Y2)

C. Control resource k in SF #N: HARQ-ACK timing=SF #(N'+Yk)

SF #N' corresponds to transmission timing of a data channel.

Similarly, a linkage configuration between an index of a data channel resource (i.e., data resource) and HARQ-ACK transmission timing and an operation example according to the linkage configuration are explained in the following. If PDSCH/PUSCH is transmitted/detected via a data resource 2 of an SF #N under a configuration described in the following, a UE can perform a HARQ-ACK transmission/reception operation on the PDSCH/PUSCH via HARQ-ACK timing=SF #(N'+Y2) linked with the data resource 2. In this case, Y1 Y2 Yk can be configured. Yn (n=1, 2, ~k) can be restricted to an integer equal to or greater than 4. A unit of the Yn (n=1, 2, ~k) can be given by an SF, a slot, or an OFDMA/SC-FDMA symbol (group).

1) Example

A. Data resource 1 in SF #N: HARQ-ACK timing=SF #(N+Y1)

B. Data resource 2 in SF #N: HARQ-ACK timing=SF #(N+Y2)

C. Data resource k in SF #N: HARQ-ACK timing=SF #(N+Yk)

Figure 15:
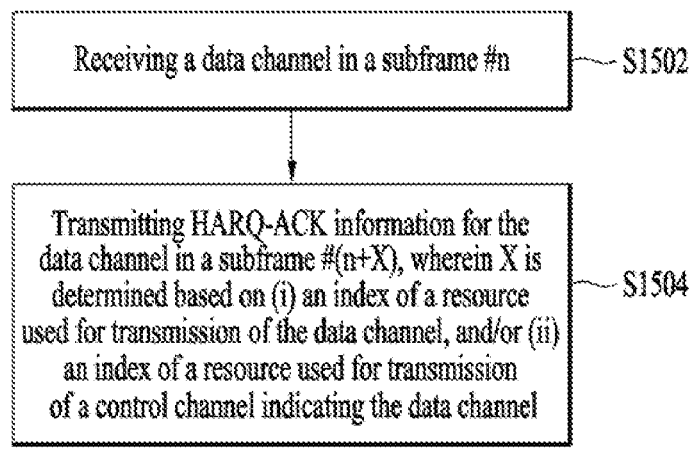

FIG. 15 is a flowchart illustrating a signal transmission procedure according to the present invention.

Referring to FIG. 15, a UE can receive a data channel in a subframe #n [S1502]. Subsequently, the UE can transmit HARQ-ACK information corresponding to the data channel in a subframe #(n+X) [S1504]. In this case, n corresponds to an integer equal to or greater than 0 and X corresponds to an integer equal to or greater than 0 and can be determined according to (i) an index of a data channel resource used for transmitting the data channel and/or (ii) an index of a control channel resource used for transmitting a control channel indicating the data channel. In this case, the data channel can include PDSCH or PUSCH. A data channel resource can include a PRB. If the data channel is transmitted using a plurality of PRBs, X can be determined according to an index of a first PRB among a plurality of the PRBs. The control channel includes (E)PDCCH. A control channel resource can include (e)CCE. If the (E)PDCCH is transmitted using a plurality of (e)CCEs, X can be determined according to an index of a first (e)CCE among a plurality of the (e)CCEs. And, the control channel resource can include (E)PDCCH candidate.

The present invention is not restricted to a UE to which CA is set only. The present invention can be identically/similarly applied not only to a normal UE (e.g., a UE operating on a single cell/carrier) to which CA is not set, but also to a specific UE (e.g., MTC (Machine Type Communication) UE) operating with a BW narrower than the entire system BW and a specific UE (e.g., low latency UE) operating based on a TTI (e.g., slot or N(<7) OFDMA/SC-FDMA symbol period) shorter than a TTI (e.g., SF) defined in a system.

Figure 16:
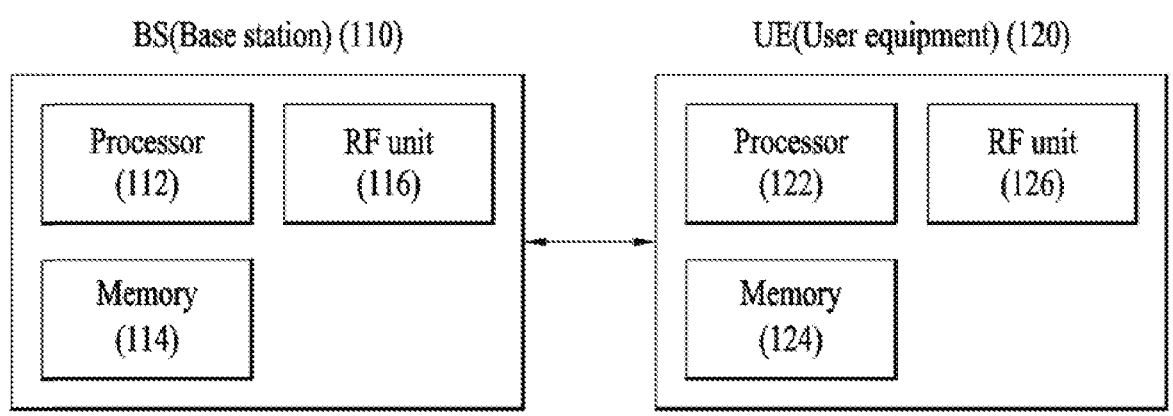
FIG. 16 illustrates a BS and a UE applicable to an embodiment of the present invention.

FIG. 16 illustrates a BS and a UE to which the present invention is applicable. When a wireless communication system includes a relay, backhaul link communication is performed between the BS and the relay and access link communication is carried out between the relay and the UE. Accordingly, the BS or UE illustrated in FIG. 16 can be replaced by the relay.

Referring to FIG. 16, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for radio communication apparatuses such as a UE, a relay, an eNB, etc.

What is claimed is:

1. A method of receiving a data by a communication device in a wireless communication system, the method comprising:
    receiving, from a base station (BS), a physical downlink control channel (PDCCH) including a first scheduling information set in a subframe (SF) #n; and
    receiving, from the BS, a physical downlink shared channel (PDSCH) in a SF #(n+X), based on the first scheduling information set and a second scheduling information set,
    wherein the second scheduling information set and the X are obtained based on a control channel resource in which the PDCCH is received in the SF #n, and
    wherein the second scheduling information set is configured by being linked to the control channel resource via a higher layer.

2. The method of claim 1, wherein the control channel resource comprises a control channel element (CCE).

3. The method of claim 2, wherein, when the PDCCH is received via a plurality of CCEs, the X is configured based on an index of a first CCE among the plurality of CCEs.

4. The method of claim 1, wherein the control channel resource comprises a PDCCH candidate.

5. The method of claim 1,
    wherein the first scheduling information set comprises resource block (RB) allocation information, a hybrid automatic repeat request (HARQ) process ID, a new data indicator (NDI), an redundancy version (RV), and a transmit power control (TPC), and
    wherein the second scheduling information set comprises a modulation and coding scheme (MCS) and a transmit block size (TBS).

6. A communication device for receiving a data in a wireless communication system, the communication device comprising:
    a radio frequency (RF) unit; and
    at least one processor connected to the RF unit,
    wherein the at least one processor configured to:
        control the RF unit to receive, from a base station (BS), a physical downlink control channel (PDCCH) including a first scheduling information set in a subframe (SF) #n, and
        control the RF unit to receive, from the BS, a physical downlink shared channel (PDSCH) in a SF #(n+X), based on the first scheduling information set and a second scheduling information set,
    wherein the second scheduling information set and the X are obtained based on a control channel resource in which the PDCCH is received in the SF #n, and
    wherein the second scheduling information set is configured by being linked to the control channel resource via a higher layer.

7. The communication device of claim 6, wherein the control channel resource comprises a control channel element (CCE).

8. The communication device of claim 7, wherein, when the PDCCH is received via a plurality of CCEs, the X is configured based on an index of a first CCE among the plurality of CCEs.

9. The communication device of claim 6, wherein the control channel resource comprises a PDCCH candidate.

10. The communication device of claim 6,
    wherein the first scheduling information set comprises resource block (RB) allocation information, a hybrid automatic repeat request (HARM) process ID, a new data indicator (NDI), an redundancy version (RV), and a transmit power control (TPC), and
    wherein the second scheduling information set comprises a modulation and coding scheme (MCS) and a transmit block size (TBS).

11. A method of transmitting a hybrid automatic repeat request-acknowledgement (HARQ-ACK) by a communication device in a wireless communication system, the method comprising:
    receiving, from a base station (BS), a data channel in a subframe #n, based on a first scheduling information set and a second scheduling information set; and
    transmitting, to the BS, a HARQ-ACK for the data channel in a subframe #(n+X),
    wherein the X is obtained based on (i) an index of a data channel resource used for reception of the data channel and/or (ii) an index of a control channel resource used for reception of a control channel related to the data channel,
    wherein the first scheduling information set is included in the control channel, and
    wherein the second scheduling information set is obtained based on the control channel resource, and is configured by being linked to the control channel resource via a higher layer.

12. The method of claim 11, wherein the data channel resource comprises a physical resource block (PRB).

13. The method of claim 12, wherein, when the data channel is received via a plurality of PRBs, the X is configured based on an index of a first PRB among the plurality of PRBs.

14. The method of claim 11, wherein the control channel resource comprises a control channel element (CCE).

15. A communication device for transmitting a hybrid automatic repeat request-acknowledgement (HARQ-ACK) in a wireless communication system, the communication device comprising:
    a radio frequency (RF) unit; and
    at least one processor connected to the RF unit,
    wherein the at least one processor configured to:
        control the RF unit to receive, from a base station (BS) a data channel in a subframe #n, based on a first scheduling information set and a second scheduling information set,
        control the RF unit to transmit, to the BS, a HARQ-ACK for the data channel in a subframe #(n+X),
    wherein the X is obtained based on (i) an index of a data channel resource used for reception of the data channel and/or (ii) an index of a control channel resource used for reception of a control channel related to the data channel, wherein the first scheduling information set is included in the control channel, and wherein the second scheduling information set is obtained based on the control channel resource, and is configured by being linked to the control channel resource via a higher layer.

16. The communication device of claim 15, wherein the data channel resource comprises a physical resource block (PRB).

17. The communication device of claim 16, wherein, when the data channel is received via a plurality of PRBs, the X is configured based on an index of a first PRB among the plurality of PRBs.

18. The communication device of claim 15, wherein the control channel resource comprises a control channel element (CCE).

* * * * *